United States Patent [11] 3,608,085

| [72] | Inventor | Thomas H. Papworth<br>New Orleans, La. |
|---|---|---|
| [21] | Appl. No. | 610,029 |
| [22] | Filed | Jan. 18, 1967 |
| [23] | | Continuation-in-part of Ser. No. 588,297, Oct. 21, 1966, abandoned |
| [45] | Patented | Sept. 21, 1971 |
| [73] | Assignee | Grain Conditioners, Inc.<br>New Orleans, La. |

[54] GRAIN PRESERVATIVE COMPOSITION AND A METHOD OF USING THE SAME
2 Claims, No Drawings

[52] U.S. Cl.......................................................... 424/317,
99/153, 424/350
[51] Int. Cl............................................................ A01n 9/02,
A01n 9/24
[50] Field of Search................................................. 167/22 G,
22 K, 38, 22 M; 99/153; 424/350, 317

[56] References Cited
UNITED STATES PATENTS

| 2,070,167 | 2/1937 | Iddings | 167/22 |
| 2,324,472 | 7/1943 | Allen et al. | 99/153 X |
| 2,948,653 | 8/1960 | Bavley et al. | 167/22 |
| 3,022,217 | 2/1962 | Roan | 167/38 X |
| 3,272,693 | 9/1966 | Harrison | 167/38 X |
| 2,417,806 | 3/1947 | Bauer et al. | 424/317 X |

FOREIGN PATENTS

| 242,017 | 12/1960 | Australia | 99/153 |
| 99,676 | 4/1925 | Austria | 167/22 |
| 555,921 | 4/1958 | Canada | 167/22 |
| 575,596 | 5/1959 | Canada | 167/22 |
| 12,781 | 5/1909 | Great Britain | 99/153 |
| 234,456 | 4/1926 | Great Britain | 167/22 |

OTHER REFERENCES
A.P.C. Application of Philipp, Ser. No. 347,311, Published 5/1943. 167/22
T. A. Horsfield et al. Journal of Agricultural Science, 1/1937, pp. 334-339-342-348

*Primary Examiner*—Albert T. Meyers
*Assistant Examiner*—Dale R. Ore
*Attorney*—Wolf, Greenfield & Hieken

ABSTRACT: A grain preservative means and method is provided for preserving stored grain for long periods of time. The preservative comprises at least one of a fatty acid, an anhydride of a fatty acid or an aldehyde of a fatty acid in combination with at least one chlorine substituted methane or ethane compound.

3,608,085

GRAIN PRESERVATIVE COMPOSITION AND A METHOD OF USING THE SAME

CROSS-REFERENCE TO RELATED APPLICATION

This application is a continuation in part of applicant's copending application Ser. No. 588,297 filed Oct. 21, 1966 in the United States Patent Office now abandoned.

BACKGROUND OF THE INVENTION

The problems of spoilage of stored grain are well known particularly in the United States where surplus crops for many years have necessitated large scale grain storage operations. Particularly when damp grains are stored in conventional silos, rapid deterioration occurs as evidenced by the presence of bacteria, fungi and malodorous products.

In efforts to overcome the problem of grain deterioration on storage, the industry has turned to aeration of stored grains and a plurality of drying mechanisms and methods. For example, cut grains are frequently aerated and partially dried with the use of complex and expensive farm equipment prior to storage. Subsequently while in storage, many silos and storage elevators are equipped with additional expensive equipment to bring about drying which does to some extent slow the breakdown and deterioration of grain products.

In spite of the drying and aeration methods now in use, millions of dollars are lost annually in the United States due to damage in high moisture grain while in storage or in transit with thousands of bushels each year often souring and decomposing prior to marketing.

SUMMARY OF THE INVENTION

It has now been found that the addition of the preservative material of this invention greatly reduces normal breakdown and deterioration of grain products and acts as a preservative for long periods of time. The preservative is a mixture of at least one compound selected from the group consisting of acetic acid and homologous fatty acids, anhydrides and aldehydes thereof admixed with at least one compound selected from the group consisting of a Chlorine substituted methane or ethane.

While the exact reason that the present material acts as a grain preservative of outstanding value is not fully known, it is believed that the use of the acid, aldehyde or anhydride in conjunction with a Chlorine substituted methane or ethane produces an atmosphere in the environment of the grain similar to that produced by live grain itself after decomposition which inhibits the growth of mold and fungi. Live grain is grain which will germinate. For example, most organic materials it is believed, have the ability to produce acids from converted starches and sugar as protection against growth of molds and fungi and other related processes of organic degradation. The use of the present material is believed to supplement the materials ordinarily produced by grain itself and will in fact preserve grain before any deterioration starts and is also useful to slow deterioration and preserve grain even if some breakdown of the organic matter of the grain has started.

DESCRIPTION OF PREFERRED EMBODIMENTS

The preservative material of this invention preferably comprises from 70 to 90 percent by volume of the chlorine substituted methane or ethane which is admixed with from 30 percent to 10 percent by volume of the entire preservative of an organic fatty acid, aldehyde or anhydride thereof or mixtures of said compounds. When an organic fatty acid is used preferably 1 percent to 5 percent by volume of the entire material of a monohydric primary alcohol of the formula R CH$_2$OH is mixed with the preservative and forms a part thereof. When an aldehyde or anhydride is used preferably 1 percent to 5 percent by volume of the entire mixture of a blending agent is used to assure blending and prevent phase separation in use.

The chlorine substituted methane or ethane compound is preferably carbon tetrachloride but such compounds as trichlorethane, tetrachlorethane, ethylene dichloride or pentachlorethane can be used as can mixtures of these compounds with each other. When mixtures are used, preferably 20 percent to 80 percent by volume of the substituted ethane is admixed with 80 percent to 20 percent by volume of the carbon tetrachloride.

While carbon tetrachloride is known as a fumigant for grain weevils and the like, its action in the present grain preservative is that of a preservative a well as a fumigant. In fact, grain stored with the grain preservative material of the present invention will remain usable for much longer periods of time than that stored in the presence of carbon tetrachloride alone.

The organic fatty acid used is preferably a monocarboxylic monobasic acid containing only one carboxyl group per molecule. While acetic acid has been found to be most desirable for use in the combination of this invention homologous acids or mixtures thereof preferably having up to 5 carbon atoms in their chain can be used. For example, formic acid, propionic acid, butyric acid, valeric, caproic acid and their isomers in the homologous series can be used. Similarly the aldehydes and/or anhydrides of the fatty acids can be used to replace the acid or in admixture therewith and include the anhydrides of formic acid, acetic acid, propionic acid, isopropionic acid, butyric acid and caproic acid and such aldehydes as formaldehyde, acetaldehyde, propionic aldehyde, butylaldehyde and caproic aldehyde. When mixtures of acidic acid and aldehydes or anhydrides are used preferably from 10 percent to 90 percent by volume of the acid is used in such mixtures.

While ethyl alcohol is the preferred alcohol for use in the grain preservative of this invention when a fatty acid is used, other common primary monohydric alcohols having from 1 to 5 carbon atoms in their chain can be used and include methanol, ethanol, 1-propanol, 2-propanol, 1-butanol and 2-butanol in the homologous series. The alcohol used reduces any undesirable odor to the grain preservative and may act to enhance the preserving properties of the material.

The blending agent if used can be any known material for assuring uniform blending of the mixture into a single phase and preventing settling of the mixture into two distinct phases. Such agents are volatile at standard room temperature and pressure and include volatile organic esters such as butyl formate.

The preservative material can be used by any of the conventional methods for adding a fumigant to grain storage sites. For example, the grain preservative of this invention is preferably sprayed or sprinkled over a bin which is then closed. The bin preferably contains bushels of the grain in enclosed substantially filled areas.

It has been found that preferably from about 1 to about 3 gallons of the grain preservative of this invention is useful to greatly prolong the life of each approximately 1,000 bushels of grain. The grain preserved by the grain preservative of this invention may be any of the known storage grains including wheat, corn, rye, oats and the like including cereals similar to the above, rice, sago, arrow root and similar carbohydrate products. Of course the specific amount of preservative used can vary depending upon the length of preservation desired and the particular conditions under which the preservative is applied as for example the size of the enclosed area within which the grain is stored.

In a preferred example setting forth the grain preserving features of this invention, a grain preservative formulation is made by mixing by volume, 85 percent carbon tetrachloride, 10 percent glacial acetic acid and 5 percent grain alcohol (ethanol 95 percent). The admixed material is then sprinkled over the top of 1,000 bushels of fresh cut wheat stored in a bin with the walls of the bin closely surrounding the piled bushels. The bin is then closed and allowed to remain closed for a period of 3 days. No decomposition of the grain was noted when the bin was again opened as opposed to a similar bin which was not treated with the grain preservative material of this invention and which did exhibit a musty foul odor and decomposition after the same period of time.

In a second example, the amount of carbon tetrachloride is increased to 90 percent and the grain alcohol is omitted. Similar results are obtained with regard to preservation as set forth in the preceding example. However, the odor of the carbon tetrachloride and glacial acetic acid was more pronounced when the bin was opened after a similar period of time. In addition, it is believed that there is less breakdown of the grain with the use of the alcohol.

When any of the monohydric primary alcohols recited above or organic monocarboxylic monobasic acids used above are substituted in the examples given above, advantageous grain preserving properties of the material are obtained. Similarly when any of the aldehydes or anhydrides noted above are substituted for the acid with the elimination of the ethanol and/or any of the chlorine substituted ethanes are substituted for the carbon tetrachloride similar results are obtained.

While specific embodiments of the grain preservative of the present invention have been described above, it should be understood that many variations are possible. For example, the grain preservative is preferred for use in enclosed areas no greater than three times the volume occupied by the grain treated, although it is also useful in open storage though its effects may not be as long-lasting. The specific ranges of materials given can vary greatly although the preferred ranges are useful to maximize the preserving action of the material. The particular length of preservation obtained by the grain preservatives of this invention depend in part upon the specific grain treated and the temperature and humidity conditions under which the preservative is used. In the examples given above, moist grain having approximately 16 percent to 20 percent moisture content was treated at standard room temperature although advantages are obtained no matter what the moisture content of the grain. Even when the grain treated is dry grain, chemical breakdown does occur without the use of the improved grain preservatives of the present invention.

While monohydric primary alcohols are preferred for use with the preservative of this invention when an acid is used, it is also possible to substitute organic esters of the monocarboxylic acids of this invention reacted with their corresponding monohydric alcohols for the primary alcohols or to use such esters in addition to the primary alcohols in the combination. These esters can also be used as the blending agent described above. Esters such as methyl formate, ethyl acetate, normal and is propyl propionate, normal and isobutyl butyrates, and normal and isoamyl as well as secondary amyl valerates can be used. Preferably when the organic esters are used they are preferably used in amounts of from 1 to 5 percent by volume of the preservative although other amounts can be used.

Therefore, this invention is to be limited only by the spirit and scope of the appended claims.

What is claimed is:

1. A grain preservative comprising by volume in admixture from about 70 percent to 90 percent of carbon tetrachloride, and from about 30 percent to 10 percent of acetic acid.

2. A method of preserving stored grain consisting essentially of contacting said grain in an enclosed area with a preservative amount of a composition comprising by volume in admixture from about 70 percent to 90 percent of carbon tetrachloride and from about 30 percent to 10 percent of acetic acid.